C. B. ROWLAND.
SANDING DEVICE FOR AUTOMOBILES.
APPLICATION FILED JUNE 22, 1922.
1,432,210.
Patented Oct. 17, 1922.
2 SHEETS—SHEET 2.
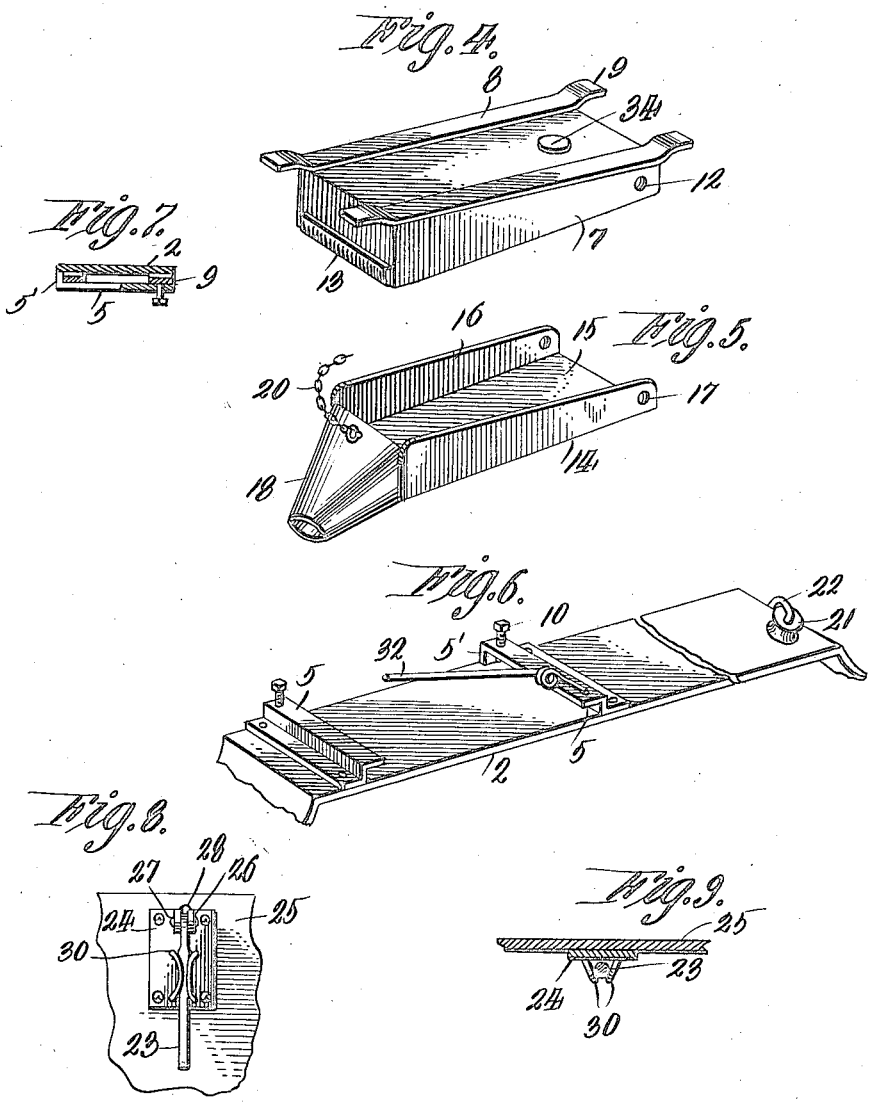
WITNESSES
Inventor
CLIFFORD B. ROWLAND
Attorney Patented Oct. 17, 1922.

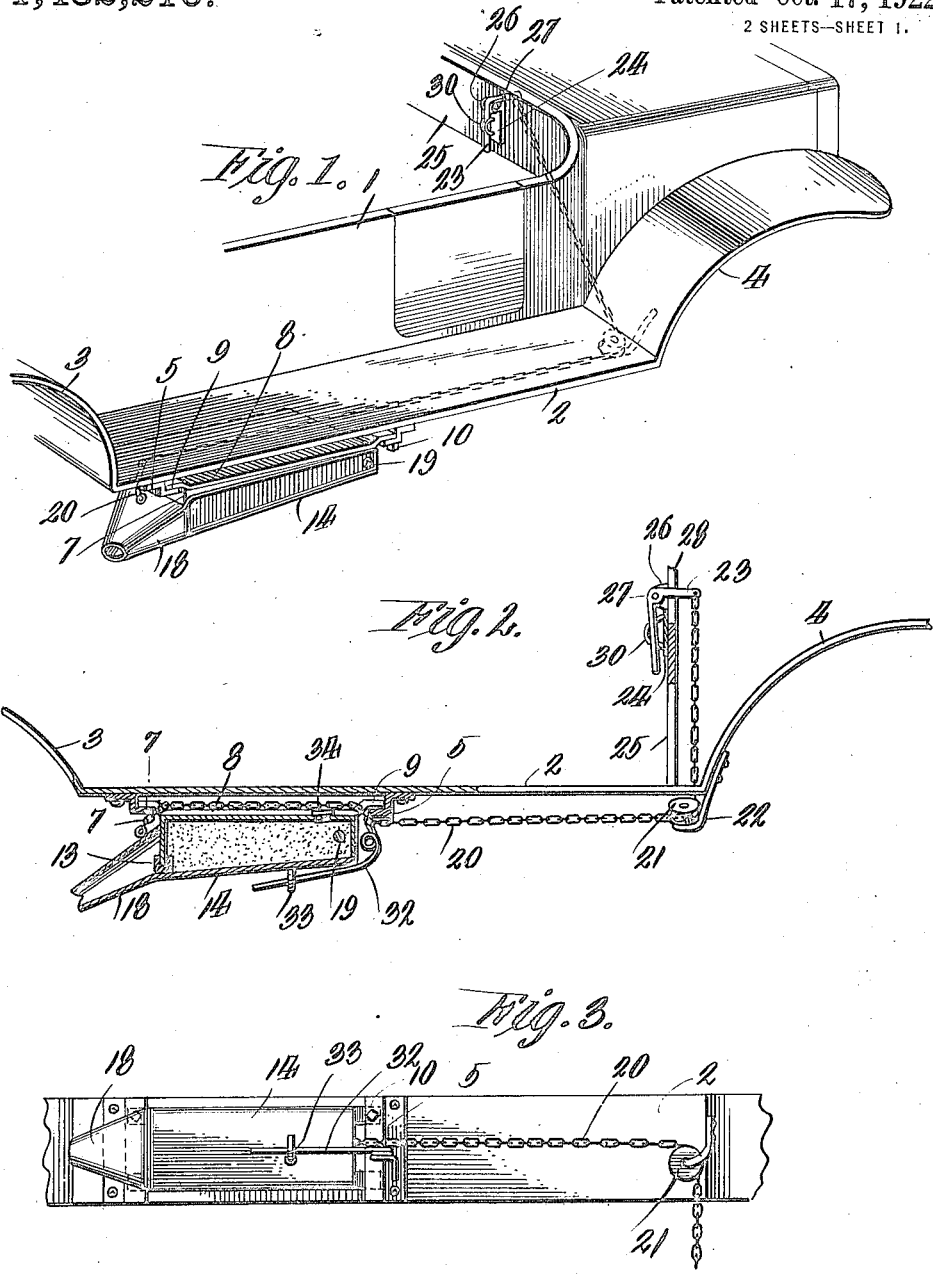

1,432,210

UNITED STATES PATENT OFFICE.

CLIFFORD BEEFE ROWLAND, OF TRENTON, NEW JERSEY.

SANDING DEVICE FOR AUTOMOBILES.

Application filed June 22, 1922. Serial No. 570,167.

*To all whom it may concern:*

Be it known that I, CLIFFORD BEEFE ROWLAND, a citizen of the United States, residing at Trenton, in the county of Mercer and State of New Jersey, have invented certain new and useful Improvements in a Sanding Device for Automobiles, of which the following is a specification.

The present invention relates generally to vehicles and more particularly to automobiles having for its principal object to provide what I term a sanding device for distributing sand, fine gravel, or other anti-skid material in the path of the rear or drive wheel of the automobile so as to prevent skidding of the automobile and slipping of the rear or drive wheel.

Another important object of the invention is to provide means for operating the sanding device in an efficient manner from the dash-board of the automobile.

Another important object of the invention is to provide means whereby the sanding device may be conveniently attached to the automobile so as to be readily removed therefrom when desired.

A further object of the invention is to provide means whereby the operating lever may be easily locked in a position so as to hold the sanding device in an inoperative position.

A still further object of the invention is to provide a sanding device which will be efficient and simple in construction, reliable in operation, durable, compact, neat in appearance, inexpensive to manufacture, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is a fragmentary perspective showing one side of an automobile body with my sanding device attached beneath the running board thereof, Figure 2 is a longitudinal section therethrough, Figure 3 is a bottom plan showing the running board and the sanding device attached thereto, Figure 4 is a detailed perspective of the box like structure forming a portion of the sanding device, Figure 5 is a detailed perspective of the receptacle thereof, Figure 6 is an inverted perspective showing the running board with the brackets thereon, Figure 7 is a detailed section taken substantially on the line 7—7 of Figure 2, Figure 8 is an elevation showing a portion of the dash of the automobile body with the operating lever attached thereto, and Figure 9 is a detailed section taken substantially on the line 9—9 of Figure 8.

Referring to the drawing in detail it will be seen that a body of an automobile is shown at 1 being provided with the usual running board 2 disposed between the rear fender 3 and the front fender 4. A pair of spaced Z-shaped bracket members 5 are fixed to the under surface of the running board 2 as shown to advantage in Figure 6 and are adapted to support the sanding device adjacent the rear fender 3 so that the anti-skid material may be distributed immediately in front of the rear or drive wheel.

This sanding device consists of an inverted box-like structure 7 having the pair of strips 8 arranged on its top adjacent its longitudinal sides which strips terminate at their ends in the slightly offset lips 9 which are adapted to engage the Z-shaped brackets 5 so that the box-like structure may be slid in and out of engagement therewith. It is to be noted that the inner ends of the Z-shaped brackets are closed by an extension 5′ so that the box-like structure 7 can only be inserted from the outside of the body. The set screws 10 are disposed in the brackets 5 and adapted to be screwed into binding engagement with the lips 9 so as to prevent the accidental removal of the sanding device. The side portions of the box-like structure 7 are provided with the apertures 12 adjacent their forward ends and the rear side has its edge covered with a strip 13.

A receptacle indicated generally at 14 includes the bottom plate 15 having the side members 16 upstanding from its longitudinal edges and provided with apertures 17 adapted to register with the apertures 12. At the rear end of this receptacle 14 there is situated a downwardly slanting spout 18. A rod or pin 19 is passed through the apertures 12 and 17 when they are in registry with one another and therefore fulcrums the receptacle in relation to the box-like structure 7. When the receptacle 14 is in a closed position as shown in Figure 2, the front end of the box-like structure acts as a valve closing the inlet of the spout 18.

A chain 20 has one end fixed to the spout 18 and passes forwardly over the top of the box-like structure 7 and is trained over a pulley 21 journalled in the bracket arm 22 and then passes through an aperture in the running board so that its other end may be fixed to a terminal of the bell crank lever 23. A plate 24 is mounted on the dash 25 of the body 1 and is provided with a pair of spaced apertured ears 26 through which passes a pin 27 which also passes through the intermediate portion of the bell crank lever 23 so as to fulcrum the same. One arm of the bell crank lever extends through a slot 28 provided in the dash 25 and it is to the terminal of this arm to which the chain 20 is attached. The other arm hereinafter called the operating arm is adapted to extend downwardly substantially parallel with the plate 24 and hold the chain 20 taut at the same time holding the sanding device in a closed position. In order to hold this bell crank lever in the position as is shown in different figures of the drawing I have provided a pair of spring members 30 which are slanted toward each other so that the space therebetween is less than the thickness of the operating arm of the bell crank lever and therefore will hold the operating arm substantially parallel with the plate 24. The chauffeur of the automobile, with very little effort, may pull toward him upon the operating arm of the bell crank lever 23 releasing the same from between the spring members 30 and allowing the receptacle 14 to fulcrum so that its spouted end will be lowered whereby the sand or other anti-skidding material contained therein may flow through the spout in the path of the rear driving wheel of the automobile. In order to make the opening movement of the sanding device positive rather than depending merely upon the force of gravitation I have provided a spring 32 which has one end attached to the forward bracket 5 and is curved so as to extend underneath the receptacle 14. A hook-shaped member 33 depends from the bottom of the receptacle 14 and is adapted to engage the spring 32 which is so tensioned as to tend to fulcrum the receptacle 14 to an open position.

In order to fill the sanding device with a new supply of anti-skidding material it is merely necessary to unloosen the set screws 10 and slide the sanding device outwardly from the running board after the bell crank lever has been released from engagement with the springs 30. By removing the plug 34 provided in the upper side of the box-like structure 7 the material may be poured into the receptacle 14. When the plug 34 is replaced the device may be slid back again into engagement with the brackets 5 and the set screws 10 tightened, the bell crank lever 23 engaged with the springs 30 and the device is now ready for operation.

From the above description it is thought that the operation and construction of the invention will be readily understood without a more detailed description. When the driver ascertains that his automobile is passing over a road that is slippery he can instantly distribute sand in advance of the rear or drive wheels so as to prevent skidding or slipping and the action of the sand will absolutely insure a positive non-slipping and non-skidding action of the wheels upon the roadway.

Since the present modification and other modifications may be made by those skilled in the art without departing from the principle of my invention, I do not wish to limit myself to the details herein shown and described other than as hereinafter claimed.

Having thus described my invention what I claim as new is:—

1. A device of the class described including in combination an inverted box-like structure, a receptacle fulcrumed at one end to the box-like structure, and a spout extending from the free end of the receptacle.

2. A device of the class described including an inverted box-like structure, a receptacle fulcrumed at one end of the box-like structure and formed with a bottom plate having upstanding longitudinally extending sides and a spout slanting downwardly from its free end.

3. A device of the class described including an inverted box-like structure, a receptacle fulcrumed at one end below the box like structure and provided with a spout at its free end, means for holding the receptacle in a closed position in relation to the box-like structure, and means tending to fulcrum the receptacle to an open position.

4. The combination with a vehicle, of means for distributing anti-skidding substances into the path of a wheel of said vehicle, said means including a receptacle pivotally mounted at one end to the vehicle and provided at its other end with a spout, and means for holding the receptacle in a closed position.

5. The combination with a vehicle, of means for distributing anti-skidding substances into the path of a wheel of said vehicle, said means including a receptacle pivotally mounted at one end to the vehicle and provided at its other end with a spout, means for holding the receptacle in a closed position, and means tending to fulcrum the receptacle to an open position.

6. In a vehicle, a sanding device, means for mounting the sanding device on the vehicle, a bell crank lever fulcrumed on the vehicle, springs curved toward each other for holding one end of the bell crank lever, a chain attached to one end of the bell crank lever, and having its other end attached to the sanding device whereby the same may be opened and closed through operation of the bell crank lever in the manner and for the purpose specified.

7. In combination, a vehicle, an inverted box-like structure, means for detachably mounting the inverted box-like structure upon the vehicle, a receptacle fulcrumed at one end to the box-like structure, a spout slanting downwardly from the free end of the receptacle, and a spring member having one end fixed to the vehicle and the other end engageable with the receptacle tending to fulcrum the same to an open position.

8. In combination, a vehicle, an inverted box-like structure, means for detachably mounting the inverted box-like structure upon the vehicle, a receptacle fulcrumed at one end to the box-like structure, a spout slanting downwardly from the free end of the receptacle, a spring member having one end fixed to the vehicle and the other end engageable with the receptacle tending to fulcrum the same to an open position, and means operable from the dash of the vehicle for holding the receptacle in a closed position.

9. In combination, a vehicle, a pair of brackets mounted on the vehicle, a box-like structure disposed in an inverted position, means on the box-like structure for engagement with the brackets, means for holding the box-like structure against accidental displacement, a receptacle fulcrumed beneath the box-like structure, a spout slanting downwardly from the free end of the receptacle, means operable from the dash of the vehicle for holding the receptacle in a closed position and means tending to fulcrum the receptacle to an open position.

In testimony whereof I affix my signature in presence of two witnesses.

CLIFFORD BEEFE ROWLAND.

Witnesses:
ANNETTE ANDERSON,
ESTELLE ROWLAND.